(12) United States Patent
Tsunoda et al.

(10) Patent No.: US 12,351,985 B2
(45) Date of Patent: Jul. 8, 2025

(54) COATED PAPER

(71) Applicants: NIPPON PAPER INDUSTRIES CO., LTD., Tokyo (JP); KANEKA CORPORATION, Osaka (JP)

(72) Inventors: Hirosuke Tsunoda, Tokyo (JP); Yoshio Yoshida, Tokyo (JP); Koji Kutsuwa, Tokyo (JP); Tetsuo Okura, Settu (JP); Yasunori Okada, Settu (JP); Asuka Fukutome, Settu (JP)

(73) Assignees: NIPPON PAPER INDUSTRIES CO., LTD., Tokyo (JP); KANEKA CORPORATION, Osaka (JP)

( * ) Notice: Subject to any disclaimer, the term of this patent is extended or adjusted under 35 U.S.C. 154(b) by 141 days.

(21) Appl. No.: 18/001,247

(22) PCT Filed: Jun. 10, 2021

(86) PCT No.: PCT/JP2021/022170
§ 371 (c)(1),
(2) Date: Dec. 8, 2022

(87) PCT Pub. No.: WO2021/256381
PCT Pub. Date: Dec. 23, 2021

(65) Prior Publication Data
US 2023/0287626 A1    Sep. 14, 2023

(30) Foreign Application Priority Data
Jun. 16, 2020 (JP) .................... 2020-104032

(51) Int. Cl.
| | | |
|---|---|---|
| *D21H 19/22* | (2006.01) | |
| *D21H 19/58* | (2006.01) | |
| *D21H 19/60* | (2006.01) | |
| *D21H 21/16* | (2006.01) | |

(52) U.S. Cl.
CPC ............ *D21H 19/22* (2013.01); *D21H 19/58* (2013.01); *D21H 19/60* (2013.01); *D21H 21/16* (2013.01)

(58) Field of Classification Search
CPC ........ D21H 19/22; D21H 19/58; D21H 19/60; D21H 21/16; D21H 17/72; D21H 19/20; D21H 27/10; D21H 19/28; Y02W 90/10
See application file for complete search history.

(56) References Cited

U.S. PATENT DOCUMENTS

| | | | |
|---|---|---|---|
| 6,033,747 A * | 3/2000 | Shiotani ................. | B32B 27/10 428/34.3 |
| 6,183,814 B1 | 2/2001 | Nangeroni et al. | |
| 2003/0217648 A1 | 11/2003 | Noda et al. | |
| 2005/0031882 A1 | 2/2005 | Noda et al. | |
| 2006/0258833 A1 | 11/2006 | Senda et al. | |
| 2014/0045684 A1 | 2/2014 | Koyama et al. | |
| 2018/0171559 A1 | 6/2018 | Hipps, Sr. et al. | |
| 2019/0270289 A1 | 9/2019 | Okamoto et al. | |
| 2020/0048493 A1* | 2/2020 | Grubbs, III ............. | C09D 7/63 |
| 2020/0269554 A1 | 8/2020 | Noda et al. | |

FOREIGN PATENT DOCUMENTS

| | | |
|---|---|---|
| CN | 1711316 A | 12/2005 |
| JP | H093795 A | 1/1997 |
| JP | H09158089 A | 6/1997 |
| JP | 2002513449 A | 5/2002 |
| JP | 2003119697 A | 4/2003 |
| JP | 2003518998 A | 6/2003 |
| JP | 2003535996 A | 12/2003 |
| JP | 2004115978 A | 4/2004 |
| JP | 2005047149 A | 2/2005 |
| JP | 2016053235 A | 4/2016 |
| JP | 006234654 B | 11/2017 |
| JP | 2020503198 A | 1/2020 |
| WO | 2004041936 A1 | 5/2004 |
| WO | 2019069963 A1 | 4/2019 |
| WO | 2021075412 A1 | 4/2021 |

OTHER PUBLICATIONS

International Preliminary Report on Patentability, dated Dec. 13, 2022, for corresponding international application PCT/JP2021/022170 (1 page).
Notification Concerning Transmittal of International Preliminary Report on Patentability, mailed Dec. 29, 2022, for corresponding international application PCT/JP2021/022170 (1 page).
Notification of Transmittal of Translation of the International Preliminary Report on Patentability, mailed Dec. 29, 2022, for corresponding international application PCT/JP2021/022170 (1 page).
Written Opinion of the International Searching Authority, mailed Sep. 14, 2021, for corresponding international application PCT/JP2021/022170 (5 pages).
"Paper Making Principles and Processes (Third Edition)", He Beihai, pp. 362-368, China Light Industry Press, Aug. 2010 (8 pages).
"Papermaking Principles and Processes", Long Xingquan, pp. 394-405, China Light Industry Press, May 1994 (14 pages).

(Continued)

*Primary Examiner* — Dennis R Cordray
*Assistant Examiner* — Matthew M Eslami
(74) *Attorney, Agent, or Firm* — Law Office of Katsuhiro Arai

(57) ABSTRACT

An object of the present invention is to provide a coated paper that includes a coating layer containing poly(3-hydroxybutyrate-co-3-hydroxyhexanoate) with few coating defects. As a solution, the present invention provides a coated paper including a coating layer containing poly(3-hydroxybutyrate-co-3-hydroxyhexanoate) and an adhesive, on at least one side of a paper substrate. A solid content weight ratio of the poly(3-hydroxybutyrate-co-3-hydroxyhexanoate) to the adhesive in the coating layer is 99.9/0.1 to 60.0/40.0.

11 Claims, No Drawings

(56) References Cited

OTHER PUBLICATIONS

"Papermaking Technology and Equipment", Wu Xun Dun et al, pp. 274-279, China Light Industry Press, Aug. 2011 (8 pages).
"Plastics Standard Assembly", Zeng Jiahua, pp. 591-598, China Light Industry Press, Feb. 1997 (10 pages).
A First Office Action issued by the State Intellectual Property Office of China on Jul. 28, 2023, for Chinese counterpart application No. 202180039278.8 (9 pages).
Extended European Search Report (EESR) dated May 10, 2024, issued for European counterpart patent application No. EP21825059.5 (6 pages).
International Search Report (ISR) mailed Sep. 14, 2021, issued for International application No. PCT/JP2021/022170. (2 pages).
A Notice of Reasons for Refusal issued by the Japanese Patent Office, mailed May 27, 2025, for Japanese counterpart application No. 2021-098168. (5 pages).
A Notice of Reasons for Refusal issued by the Japanese Patent Office, mailed May 27, 2025, for Japanese counterpart application No. 2021-098169. (4 pages).

* cited by examiner

COATED PAPER

CROSS-REFERENCE TO RELATED APPLICATIONS

This application is the U.S. National Phase under 35 U.S.C. § 371 of International Application PCT/JP2021/022170, filed Jun. 10, 2021, which claims priority to Japanese Patent Application No. JP2020-104032, filed Jun. 16, 2020. The International Application was published under PCT Article 21(2) in a language other than English.

TECHNICAL FIELD

The present invention relates to coated paper.

BACKGROUND ART

Conventionally known coated paper is obtained by applying an aqueous dispersion liquid of resin on a paper base material (base paper) to impart functions such as water resistance, oil resistance, gas barrier property, water vapor barrier property, and heat-sealing property to the paper. For example, Patent Literature 1 (Japanese Patent Laid-Open No. H09-003795) discloses water- and oil-resistant paper on which an aqueous emulsion containing an acrylic-based emulsion and a wax-based emulsion is applied, Patent Literature 2 (Japanese Patent Laid-Open No. 2003-119697) discloses moisture-proof paper coated with a mixture of a synthetic resin emulsion and a wax-based emulsion, and Patent Literature 3 (Japanese Patent Laid-Open No. 2004-115978) discloses water-resistant antifungal paper coated with a water-dispersible antifungal agent.

In recent years, actions are being taken to prevent the destruction of the environment caused by plastic waste, and disposable products made of plastic are required to be replaced by material with smaller loads on the environment. Examples of replacement materials for plastic include biodegradable plastic, wood, and paper. As described above, the coated paper is capable of manifesting a variety of functions derived from the applied resin. However, if the applied resin is derived from a fossil resource or is non-biodegradable, the effect of reducing the load on the environment achieved by using paper is reduced. Thus, coated paper obtained by coating a paper base material with an aqueous dispersion liquid of biodegradable plastic has been desired.

Aliphatic polyesters such as polylactic acid and polycaprolactone are known biodegradable plastics. Unfortunately, aliphatic polyesters take a long time for biodegradation at low temperatures, and the degradation rate in the natural environment such as the ocean is undesirably slow.

Meanwhile, a poly(3-hydroxybutyrate)-based resin is a microbially produced thermoplastic plastic that uses plant material and has excellent degradation property under aerobic and anaerobic conditions. The poly(3-hydroxybutyrate)-based resin has a notable performance of being decomposed in a short time by microorganisms even in water such as in the ocean. The poly(3-hydroxybutyrate)-based resin is thermoplastic and can be processed by, for example, extrusion molding or injection molding. Furthermore, an aqueous dispersion liquid of biodegradable polyester is known that contains poly(3-hydroxybutyrate-co-3-hydroxyhexanoate) (hereinafter, also referred to as "P3HB3HH" or "PHBH"), which is a copolymer of 3-hydroxybutyrate and 3-hydroxyhexanoate. For example, Patent Literature 4 (International Patent Laid-Open No. 2004/041936) discloses an aqueous dispersion liquid of biodegradable polyester that is excellent in film forming property and gives a resin coating film that is flexible, extends well, and resists bending in applications such as paints, adhesives, fiber processing, sheet and film processing, and paper processing. Unfortunately, the coating layer formed by applying the aqueous dispersion of PHBH is apt to cause coating defects such as a cracks or a pinholes.

BACKGROUND ART LITERATURE

Patent Literature

Patent Literature 1: Japanese Patent Laid-Open No. H09-003795
Patent Literature 2: Japanese Patent Laid-Open No. 2003-119697
Patent Literature 3: Japanese Patent Laid-Open No. 2004-115978
Patent Literature 4: International Patent Laid-Open No. 2004/041936

SUMMARY OF THE INVENTION

Problems to be Solved by the Invention

An object of the present invention is to provide coated paper that includes a coating layer containing poly(3-hydroxybutyrate-co-3-hydroxyhexanoate) with few coating defects.

Means for Solving the Problems

The means for achieving the object of the present invention are as follows:
1. A coated paper characterized in that:
   the coated paper includes a coating layer including poly(3-hydroxybutyrate-co-3-hydroxyhexanoate) and an adhesive, on at least one side of a paper base material,
   wherein a solid content weight ratio of the poly(3-hydroxybutyrate-co-3-hydroxyhexanoate) to the adhesive in the coating layer is 99.9/0.1 to 60.0/40.0.
2. The coated paper according to 1, characterized in that a coating amount (dry weight) of the coating layer is 1.0 g/m$^2$ or more and 50.0 g/m$^2$ or less per one side.
3. The coated paper according to 1 or 2, characterized in that a grammage of the paper base material is 20 g/m$^2$ or more and 600 g/m$^2$ or less as measured in accordance with JIS P 8124.
4. The coated paper according to any one of 1 to 3, characterized in that the paper base material has the coating layer comprising the poly(3-hydroxybutyrate-co-3-hydroxyhexanoate) and the adhesive, on both sides of the paper base material.
5. The coated paper according to any one of 1 to 4, characterized by further comprising a seal layer between the paper base material and the coating layer.
6. The coated paper according to 5, characterized in that a coating amount (dry weight) of the seal layer is 3.0 g/m$^2$ or more and 15.0 g/m$^2$ or less per one side.
7. The coated paper according to any one of 1 to 6, characterized in that the adhesive includes at least one type selected from the group consisting of polyvinyl alcohols, starches, cellulose derivatives, partially-saponified ethylene-vinyl acetate copolymers, styrene-butadiene copolymer latex, conjugated diene-based polymer latex of a methyl methacrylate-butadiene copolymer, and acrylic-based polymer latex.

8. The coated paper according to 7, characterized in that the adhesive may include one type selected from the group consisting of fully-saponified polyvinyl alcohol and partially-saponified polyvinyl alcohol.
9. The coated paper according to 7, characterized in that the adhesive includes partially-saponified ethylene-vinyl acetate copolymers.
10. The coated paper according to any one of 1 to 10, characterized in that the coating layer is a heat-sealing layer.
11. The coated paper according to any one of 1 to 9, characterized in that the coating layer is a water-resistant layer.
12. The coated paper according to any one of 1 to 9, characterized in that the coating layer is an oil-resistant layer.
13. The coated paper according to any one of 1 to 12, characterized in that it is used for a paper cup.
14. The coated paper according to any one of 1 to 12, characterized in that it is used for a paper container.
15. The coated paper according to any one of 1 to 12, characterized in that it is used for a paper box.
16. The coated paper according to any one of 1 to 12, characterized in that it is used for a paper plate.
17. The coated paper according to any one of 1 to 12, characterized in that it is used for a paper tray.
18. The coated paper according to any one of 13 to 17, characterized in that a grammage of the paper base material is 150 $g/m^2$ or more and 300 $g/m^2$ or less measured in accordance with JIS P 8124.

Effects of the Invention

The coated paper of the present invention includes a coating layer with few coating defects and prevents a decrease in quality otherwise caused by coating defects. Furthermore, since the coated paper of the present invention is entirely biodegradable, even if the coated paper is discharged to the environment, the coated paper is promptly decomposed.

MODE FOR CARRYING OUT THE INVENTION

The present invention relates to coated paper that includes a coating layer containing poly(3-hydroxybutyrate-co-3-hydroxyhexanoate) and an adhesive on at least one side of a paper base material.

The solid content weight ratio (PHBH/adhesive) of the poly(3-hydroxybutyrate-co-3-hydroxyhexanoate) and the adhesive in the coating layer is 99.9/0.1 to 60.0/40.0.

It should be noted that, in the present description, the phrase "A to B" (A and B are numerical values) means a numerical value range including A and B, that is, "A or more and B or less".

(Paper Base Material)

A paper base material is a sheet mainly made of pulp and obtained by further processing through papermaking of paper material including, for example, filler and various auxiliary agents.

Pulp may be leaf bleached kraft pulp (LBKP), needle bleached kraft pulp (NBKP), leaf unbleached kraft pulp (LUKP), needle unbleached kraft pulp (NUKP), chemical pulp such as sulfite pulp, stone ground pulp, mechanical pulp such as thermomechanical pulp, de-inked pulp, wood fiber of recycled waste-paper pulp and the like, or non-wood fiber obtained from kenaf, bamboo, linen, and the like. These pulps may be mixed and used as deemed appropriate.

Among these, the chemical pulp and mechanical pulp of wood fiber are preferably used, and the chemical pulp is more preferably used for reasons including the fact that foreign matter is unlikely to be mixed into a paper base material, discoloration over time is unlikely to occur when the pulp is reused as the material for recycled waste-paper, and they have high value in use as packaging material in particular since sheet appearance is good for printing due to high whiteness. Specifically, the content of the chemical pulp such as LBKP and NBKP relative to the entire pulp is preferably 80% or more, and the content of the chemical pulp is particularly preferred to be 100%.

For the filler, known filler may be used including, for example, inorganic filler such as talc, kaolin, calcined kaolin, clay, ground calcium carbonate, precipitated calcium carbonate, white carbon, zeolite, magnesium carbonate, barium carbonate, titanium dioxide, zinc oxide, silicon oxide, amorphous silica, aluminum hydroxide, calcium hydroxide, magnesium hydroxide, zinc hydroxide, barium sulfate, and calcium sulfate, and organic filler such as a urea-formalin resin, a polystyrene resin, a phenol-based resin, and minute hollow particles. It should be noted that filler is not an essential material and does not necessarily have to be used.

Examples of various auxiliary agents include sizing agents such as rosin, alkyl ketene dimer (AKD), and alkenyl succinic anhydride (ASA), dry paper strength enhancing agents such as a polyacrylamide-based polymer, a polyvinyl alcohol-based polymer, cationized starch, various modified starches, a urea-formalin resin, and a melamine-formalin resin, wet paper strength enhancing agents, a yield improving agent, a drainage enhancing agent, a coagulant, aluminum sulfate, a bulking agent, a dye, a fluorescent whitening agent, a pH adjusting agent, a defoaming agent, an ultraviolet protective agent, a fading inhibitor, a pitch control agent, and a slime control agent. These auxiliary agents may be selected and used as deemed appropriate according to needs.

The surface of the paper base material may be treated with various chemical agents. Examples of the chemical agents include oxidized starch, hydroxyethyl etherified starch, enzyme-modified starch, polyacrylamide, polyvinyl alcohol, a surface sizing agent, a water-resistant additive, a moisture-retention agent, a thickening agent, and a lubricant. Any of these chemicals may be used alone, or two or more chemicals may be combined. Furthermore, each of the various chemical agents may be used with pigment. For pigment, an inorganic pigment such as kaolin, clay, engineered kaolin, delaminated clay, ground calcium carbonate, precipitated calcium carbonate, mica, talc, titanium dioxide, barium sulfate, calcium sulfate, zinc oxide, silicic acid, silicate, colloidal silica, and satin white, as well as solid-type, hollow-type, core-shell-type, and other organic pigments may be used. Any one of the pigments may be used alone or two or more pigments may be combined.

Although the grammage of the paper base material may be selected as deemed appropriate according to, for example, the desired qualities or usage, the grammage of the paper base material, in general, is preferably 20 $g/m^2$ or more and 600 $g/m^2$ or less, and more preferably 25 $g/m^2$ or more and 600 $g/m^2$ or less. When the paper base material is used as, for example, packaging material such as packaging paper, paper bags, cover material, liners, and soft packaging material or posters that are used outdoors, the grammage of the paper base material is even more preferably 30 $g/m^2$ or more and 150 $g/m^2$ or less. It should be noted that, among packaging materials, soft packaging material refers particularly to packaging material that uses thin paper with a grammage of approximately 30 g/m² to 100 g/m² and is high in flexibility. Furthermore, when the paper base material is used as, for example, paper cups, paper containers, paper boxes, paper plates, or paper trays, the grammage of the paper base material is even more preferably 150 g/m² or more and 300 g/m² or less.

Although the density of the paper base material may be selected as deemed appropriate according to, for example, the desired qualities or ease of handling, the density of the paper base material, in general, is preferably 0.5 g/cm³ or more and 1.0 g/cm³ or less.

The method for producing the paper base material (papermaking) is not limited to a particular method, and conventionally known production (papermaking) methods and paper machines including, for example, a Fourdrinier machine, a cylinder paper machine, a Tanmo paper machine, and a twin-wire paper machine such as a gap former and a hybrid former (open top former) may be selected. Additionally, the pH during papermaking may be in any of an acid region (acid papermaking), a pseudo-neutral region (pseudo-neutral papermaking), a neutral region (neutral papermaking), and an alkaline region (alkaline papermaking). Papermaking may be performed in the acid region, and then the surface of the paper layer may be coated with an alkaline chemical agent. Furthermore, the paper base material may be constituted by one layer or multiple layers of two or more layers.

Additionally, when the surface of the paper base material is treated with a chemical agent, the surface treatment method is not limited to a particular method, and a known coating device such as a rod metering size press, a pond size press, a gate roll coater, a spray coater, a blade coater, or a curtain coater may be used.

(Seal Layer)

The coated paper of the present invention may include a seal layer between the paper base material and the coating layer.

The seal layer prevents a decrease in the performance of the coating layer by inhibiting a coating liquid for a coating layer from soaking down into the paper base material. The seal layer is not particularly limited as long as the seal layer can inhibit the coating liquid for a coating layer from soaking down into the paper base material but preferably includes, for example, a pigment and a binder. Also, the seal layer may contain, for example, a sizing agent, a water-resistant additive, a water repellent, a dye, or a surfactant according to needs.

Examples of the pigment include inorganic pigments such as precipitated calcium carbonate, ground calcium carbonate, kaolin, calcined kaolin, engineered kaolin, clay, delaminated clay, talc, silica, colloidal silica, calcium sulfate, barium sulfate, titanium dioxide, zinc oxide, zinc sulfide, zinc carbonate, satin white, aluminum silicate, calcium silicate, magnesium silicate, aluminum hydroxide, alumina, magnesium carbonate, magnesium hydroxide, kaolinite, antigorite, smectite, vermiculite, and mica, or organic pigments including a resin such as an acrylic-based or methacrylic-based resin, a vinyl chloride-based resin, a vinyl acetate-based resin, a polyester-based resin, a styrene-acrylic-based resin, a styrene-butadiene-based resin, a styrene-isoprene-based resin, a polycarbonate-based resin, a silicone-based resin, a urea resin, a melamine-based resin, an epoxy-based resin, a phenol-based resin, and a diallyl phthalate-based resin. Any of these pigments may be used alone, or two or more pigments may be combined.

For the binders, any kind of binders generally used in, for example, the field of coated paper may be used as deemed appropriate. Examples include polyvinyl alcohols such as fully-saponified polyvinyl alcohol, partially-saponified polyvinyl alcohol, acetoacetylated polyvinyl alcohol, carboxy-modified polyvinyl alcohol, amide-modified polyvinyl alcohol, sulfonic acid-modified polyvinyl alcohol, butyral-modified polyvinyl alcohol, olefin-modified polyvinyl alcohol, nitrile-modified polyvinyl alcohol, pyrrolidone-modified polyvinyl alcohol, silicone-modified polyvinyl alcohol, other modified polyvinyl alcohols, and an ethylene vinyl alcohol copolymer, an acrylic-based resin constituted by (meth)acrylic acid and a monomer component (except olefin) that is copolymerizable with (meth)acrylic acid, an ethylene-acrylic-based resin, cellulose derivatives such as hydroxymethyl cellulose, hydroxyethyl cellulose, methylcellulose, ethylcellulose, carboxymethyl cellulose, and acetyl cellulose, starches such as oxidized starch, etherified starch, and esterified starch, a styrene-maleic anhydride copolymer, a styrene-butadiene copolymer, casein, gum arabic, polyvinyl chloride, polyvinyl acetate, polyacrylamide, polyacrylic acid ester, polyvinyl butyral, polystyrol, and copolymers thereof, a polyamide resin, a silicone-based resin, a petroleum resin, a terpene resin, a ketone resin, and a coumarone resin. Any of these binders may be used alone, or two or more binders may be combined.

The present invention is preferred since biodegradability of the entire coated paper is further improved by using biodegradable binders such as polyvinyl alcohols, cellulose derivatives, or starches for the seal layer.

Using a binder with high water vapor barrier property imparts water vapor barrier property to the seal layer. To impart water vapor barrier property to the seal layer, the binder is preferably selected from an ethylene vinyl alcohol copolymer, an ethylene-acrylic-based resin, and a styrene-butadiene copolymer. Any of these binders may be used alone, or two or more binders may be combined.

The content of the pigment in the seal layer is preferably in the range of 1 part by weight or more and 1000 parts by weight or less, and more preferably 10 parts by weight or more and 500 parts by weight or less relative to 100 parts by weight of the binder in dry weight.

(Coating Layer)

The coating layer includes the PHBH and the adhesive with a solid content weight ratio (PHBH/adhesive) in a range of 99.9/0.1 to 60.0/40.0.

<PHBH>

The PHBH is a copolymer of 3-hydroxybutyrate (hereinafter, also referred to as 3HB) and 3-hydroxyhexanoate (hereinafter, also referred to as 3HH) and is a biodegradable resin known to be produced by microorganisms. In the present invention, the PHBH may be produced using microorganisms or may be produced using petroleum resources, but the PHBH is preferably produced using microorganisms from the aspect of reducing load on the environment.

The microorganisms that produce PHBH are not limited to particular microorganisms and may be any microorganisms that accumulate PHBH within the cells. Examples of the microorganisms include bacteria that belong to the genus *Alcaligenes* such as *A. lipolytica*, *A. eutrophus*, and *A. latus*, the genus *Pseudomonas*, the genus *Bacillus*, the genus *Azotobacter*, the genus *Nocardia*, and the genus *Aeromonas*. From the aspect of productivity of PHBH, a particularly preferred microorganism among these includes a strain of, for example, *Aeromonas caviae* and, moreover, *Alcaligenes eutrophus* AC32 into which genes of PHA synthetic enzymes have been introduced (Deposit number: FERM BP-6038, Date of deposit: Aug. 7, 1997, National Institute of Advanced Industrial Science and Technology, International Patent Organism Depositary, Address: 6 Chuo, 1-1-1, Higashi, Tsukuba, Ibaraki, Japan) (J. Bacteriol., 179, p4821-4830 (1997)). Additionally, a method for obtaining PHBH from *Aeromonas caviae*, which is a microorganism that belongs to the genus *Aeromonas*, is disclosed in, for example, Japanese Patent Laid-Open No. 05-093049. It should be noted that these microorganisms are cultured under appropriate conditions, and bacteria accumulate PHBH within their bodies.

A carbon source used for culturing and culture conditions may be achieved in accordance with, but not limited to, the method disclosed in, for example, Japanese Patent Laid-Open No. 05-093049 and Japanese Patent Laid-Open No. 2001-340078.

The composition ratio (mol %) of PHBH is preferably 3HB:3HH=97:3 to 75:25, and more preferably 95:5 to 85:15. If the composition of 3HH is less than 3 mol %, the properties of the PHBH becomes similar to the properties of the 3HB homopolymer. Thus, flexibility is lost and the film-forming temperature becomes excessively high, which are undesirable tendencies. If the composition of 3HH exceeds 25 mol %, crystallization speed becomes too slow, which is unsuitable for film forming. Additionally, decrease in crystallinity tends to cause the resin to become soft and to decrease the flexural modulus. The composition ratio of the PHBH can be measured by NMR analysis of powder obtained by subjecting the aqueous dispersion liquid to centrifugal separation, followed by drying.

PHBH produced by microorganisms is a random copolymer. The mol ratio of the copolymer is adjusted by a method such as selection of bacteria, selection of the carbon source, which is raw material, blending with PHBH having a different mol ratio, and blending with 3HB homopolymer.

According to one embodiment of the present invention, the weight-average molecular weight of the PHBH in the aqueous dispersion liquid is 50,000 to 550,000, preferably 100,000 to 500,000, and even more preferably 150,000 to 450,000. When the weight-average molecular weight of PHBH in the aqueous dispersion liquid is within the above-described range, the aqueous dispersion liquid containing PHBH is advantageous in that it is capable of forming film at low temperatures, and the obtained coated paper has good heat sealability. It should be noted that the weight-average molecular weight of PHBH in the aqueous dispersion liquid is calculated as a polystyrene conversion molecular weight obtained by gel permeation chromatography (GPC, such as "Shodex GPC-101" manufactured by SHOWA DENKO K.K.) using polystyrene gel (such as "Shodex K-804" manufactured by SHOWA DENKO K.K.) for a column with chloroform serving as a mobile phase. It should be noted that, for the measuring sample, powder is used that is obtained by subjecting the aqueous dispersion liquid containing PHBH to centrifugal separation, followed by drying.

The average particle size of PHBH in the aqueous dispersion liquid of the present invention is preferably 0.1 to 50 μm, and more preferably 0.5 to 10 μm. PHBH with an average particle size of less than 0.1 μm is difficult to be produced by the microorganisms, and even if a chemical synthetic procedure is used to obtain such PHBH, a microparticulation process is required. If the average particle size exceeds 50 μm, the surface of the applied aqueous dispersion liquid containing PHBH may have unevenness. It should be noted that the average particle size of the PHBH refers to the corresponding particle size when the cumulative amount of all particles reaches 50% in a normal distribution obtained by using a general-purpose particle size distribution meter such as Microtrac particle size distribution meter (FRA manufactured by Nikkiso Co., Ltd.) with the aqueous suspension of PHBH adjusted to a predetermined concentration.

The solid content concentration of PHBH in the aqueous dispersion liquid is preferably 5 to 70% by weight, and more preferably 10 to 50% by weight. If the solid content concentration is less than 5% by weight, formation of a coating film tends to fail. If it exceeds 70% by weight, viscosity of the aqueous dispersion liquid becomes too high, which tends to hinder the coating process.

<Adhesive>

The adhesive adheres PHBH in the coating layer with the paper base material and/or adheres PHBH to itself in the coating layer. According to the coated paper of the present invention, since the coating layer includes adhesive, PHBH is closely attached to the paper base material, and a uniform coating layer is obtained that has reduced coating defects such as cracks or pinholes.

The adhesive may be any adhesive without any particular limitation as long as the adhesive dissolves or is dispersed in water and is capable of adhering PHBH in the coating layer with the paper base material and/or adheres PHBH to itself. Examples include polyvinyl alcohols such as fully-saponified polyvinyl alcohol, partially-saponified polyvinyl alcohol, acetoacetylated polyvinyl alcohol, carboxy-modified polyvinyl alcohol, amide-modified polyvinyl alcohol, sulfonic acid-modified polyvinyl alcohol, butyral-modified polyvinyl alcohol, olefin-modified polyvinyl alcohol, nitrile-modified polyvinyl alcohol, pyrrolidone-modified polyvinyl alcohol, silicone-modified polyvinyl alcohol, other modified polyvinyl alcohols, and an ethylene vinyl alcohol copolymer, starches such as oxidized starch, etherified starch, and esterified starch, cellulose derivatives such as hydroxymethyl cellulose, hydroxyethyl cellulose, methylcellulose, ethylcellulose, carboxymethyl cellulose, acetyl cellulose, and nano cellulose, a partially-saponified ethylene-vinyl acetate copolymer, styrene-butadiene copolymer latex, conjugated diene-based polymer latex of a methyl methacrylate-butadiene copolymer, acrylic-based polymer latex, styrene-maleic anhydride copolymer latex, polyvinyl chloride latex, polyvinyl acetate latex, and the like. Any one or more of these may be selected and used as deemed appropriate.

Among these, it preferably includes at least one type selected from a group consisting of polyvinyl alcohols, starches, cellulose derivatives, a partially-saponified ethylene-vinyl acetate copolymer, styrene-butadiene copolymer latex, conjugated diene-based polymer latex of a methyl methacrylate-butadiene copolymer, and acrylic-based polymer latex. More preferably, it consists of at least one type selected from the group. Additionally, since it is biodegradable, it more preferably includes at least one type selected from a group consisting of polyvinyl alcohols, starches, cellulose derivatives, and a partially-saponified ethylene-vinyl acetate copolymer. Even more preferably, it includes at least one type selected from a group consisting of fully-saponified polyvinyl alcohol, partially-saponified polyvinyl alcohol, and a partially-saponified ethylene-vinyl acetate copolymer.

Including at least one of fully-saponified polyvinyl alcohol and partially-saponified polyvinyl alcohol as the adhesive is preferred because it further improves the adhesion between PHBH in the coating layer and the paper base material, and/or between the PHBHs in the coating layer.

The adhesive more preferably consists of at least one of fully-saponified polyvinyl alcohol and partially-saponified polyvinyl alcohol.

Furthermore, including a partially-saponified ethylene-vinyl acetate copolymer as the adhesive is preferred because it further improves adhesion between PHBH in the coating layer with the paper base material and/or between the PHBHs in the coating layer, as well as improving water resistance of the coating layer. The adhesive more preferably consists of a partially-saponified ethylene-vinyl acetate copolymer.

The coating layer includes PHBH and adhesive in a range of 99.9/0.1 to 60.0/40.0 by solid content weight ratio (PHBH/adhesive). If the adhesive is below this range, coating defects such as cracks or pinholes are likely to occur in the coating layer, and, in some cases, surface strength of the coating layer and adhesion between the coating layer and the paper base material may decrease. If the adhesive is greater than this range, functionality of including PHBH is sometimes not sufficiently exhibited. The solid content weight ratio of the PHBH and the adhesive is preferably 99.0/1.0 to 70.0/30.0, and more preferably 98.0/2.0 to 75.0/25.0.

It should be noted that the coating layer may contain, besides PHBH and adhesive, various auxiliary agents added to a coating liquid in the papermaking field according to needs. Examples of the auxiliary agents include a dispersant, viscosity-modifying agents, moisture-retention agents, defoaming agents, water-resistant additives, fluorescent dyes, coloring dyes, coloring pigments, surfactants, pH adjusters, cationic resins, anionic resins, UV absorbents, and metallic salts.

Since the coating layer includes PHBH, functionality of PHBH is exhibited, and the coating layer may be used as, for example, a heat-sealing layer, a water-resistant layer, or an oil-resistant layer. It should be noted that the coating layer may be provided on only one side of the paper base material or may be provided on both sides.

The heat-sealing layer refers to a layer having heat sealability and specifically refers to a layer that can adhere to an object by thermal compression bonding.

The water-resistant layer refers to a layer that has a water absorptiveness (Cobb value) of 20 $g/m^2$ or less measured with a contact time of 120 seconds in accordance with "Paper and board—Determination of water absorptiveness—Cobb method" specified in JIS P 8140: 1998. Water absorptiveness is preferably 10 $g/m^2$ or less, and more preferably 5 $g/m^2$.

The oil-resistant layer refers to a layer that gives 10 or higher for the lowest value of the Kit number measured at any five points on the layer surface in accordance with "Paper and Paperboard—Testing Method for Oil Repellency—Kit Method" specified in JAPAN TAPPI No. 41:2000. The lowest value of the Kit number is preferably 11 or higher, and more preferably 12.

<Method for Producing Coated Paper>

The coated paper of the present invention may be produced by coating a paper base material with a coating liquid for a coating layer, followed by drying. In the case in which a seal layer is provided, before coating the paper base material with the coating liquid for a coating layer, or at the same time as when the coating liquid for a coating layer is applied, a coating liquid for a seal layer is applied so that the seal layer is located between the paper base material and the coating layer.

The method for applying the seal layer and the coating layer is not limited to a particular method, and a known coating device and type of coating may be used for coating. Examples of the coating device include a blade coater, a bar coater, an air knife coater, a curtain coater, a spray coater, a roll coater, a reverse roll coater, a size press coater, and a gate roll coater. Additionally, examples of the type of coating include a water-based coating that uses a solvent such as water and a solvent-based coating that uses a solvent such as an organic solvent. The coated paper of the present invention has properties of including the biomass-derived PHBH and being biodegradable. The coated paper of the present invention thus has a low load on the environment. For this reason, it is also preferred to use a water-based coating that has a low load on the environment in the production process.

Viscosity, solid content concentration, and the like of the coating liquid for a seal layer and the coating liquid for a coating layer may be adjusted as deemed appropriate in accordance with, for example, the coating device and the type of coating used.

The method for drying the seal layer and the coating layer includes, for example, normal methods such as a steam heater, a gas heater, an infrared heater, an electric heater, a hot-air heater, a microwave, and a cylinder dryer.

A high drying temperature is preferred because it promotes film formation of the PHBH, which is likely to give rise to heat-sealing property, water resistance, and oil resistance.

The coating amount (dry weight) of the seal layer is preferably 3.0 $g/m^2$ or more and 15.0 $g/m^2$ or less. When the coating amount is less than 3.0 $g/m^2$, it may cause the seal effect to be insufficient. On the other hand, when the coating amount exceeds 15.0 $g/m^2$, it increases burden on drying during coating, which is undesirable from both viewpoints including operational aspect and cost aspect.

The seal layer may be constituted by one layer or two or more layers. If the seal layer includes two or more layers, the coating amount obtained by adding up the coating amounts of all the seal layers is preferably in the range described above in dry weight.

The coating amount (dry weight) of the coating layer is not limited to a particular amount as long as its performance is exhibited, but, for example, the coating amount is preferably 1.0 $g/m^2$ or more and 50.0 $g/m^2$ or less per one side. A coating amount less than 1.0 $g/m^2$ per one side may fail to sufficiently exhibit performance attributed to PHBH. Furthermore, a coating amount exceeding 50.0 $g/m^2$ per one side hardly improves properties any more, and increases the cost. The coating amount (dry weight) of the coating layer is preferably 5.0 $g/m^2$ or more and 40.0 $g/m^2$ or less, and more preferably 10.0 $g/m^2$ or more and 30.0 $g/m^2$ or less per one side.

The coating layer may be constituted by one layer or two or more layers. If the coating layer includes two or more layers, the coating amount obtained by adding up the coating amounts of all the coating layers is preferably in the range described above in dry weight.

The coated paper of the present invention may be used for a variety of applications in accordance with the function of the coating layer. Also, the coating layer may simultaneously include functions of two or more layers selected from, for example, a heat-sealing layer, a water-resistant layer, and an oil-resistant layer.

Since the coated paper including the heat-sealing layer as the coating layer is easily formable, easy to maintain the shape, and easily provides sealing performance, the coated paper may be suitably used for, for example, paper bags, paper containers, paper boxes, paper cups, (soft) packaging material, and lid material.

The coated paper including the water-resistant layer as the coating layer may be suitably used for, for example, packaging paper, paper containers, paper boxes, paper bags, paper cups, (soft) packaging material, paper plates, paper trays, and posters that are used outdoors.

The coated paper including the oil-resistant layer as the coating layer may be suitably used for, for example, (soft) packaging material and packaging paper for oily food such as hamburgers, hot dogs, French fries, karaage, and potato chips, liners for deep-fried food such as tempura, paper plates, paper trays, and paper cups.

The coated paper of the present invention inhibits a decrease in the performance of the coating layer when the seal layer is located between the paper base material and the coating layer as described above. In particular, in the application for the paper base material with a grammage of approximately 150 g/m² or more and 300 g/m² or less measured in accordance with JIS P 8124, such as paper cups, paper containers, paper boxes, paper plates, and paper trays, the coated paper preferably includes the seal layer since a decrease in the performance of the coating layer is particularly effectively inhibited, and the advantages of the present invention are easily delivered.

EXAMPLES

The present invention is explained in detail below using examples; however, the present invention is obviously not limited to these examples. It should be noted that, unless otherwise specified, "parts" and "%" in the example refer to "parts by weight" and "% by weight", respectively. Tests were conducted based on the evaluation method as shown below on the obtained coated paper.

Example 1

(Preparation of Coating Liquid 1 for Coating Layer)
A PHBH aqueous dispersion liquid with a PHBH solid content concentration of 50% by weight was obtained by the method disclosed in Patent Literature 4. Subsequently, the PHBH aqueous dispersion liquid was hydrolyzed at 60° C. to adjust the molecular weight. This gave PHBH aqueous dispersion liquid with a PHBH weight-average molecular weight of 230,000.

Next, the PHBH aqueous dispersion liquid and the adhesive (fully-saponified polyvinyl alcohol 28-98 manufactured by KURARAY CO., LTD.) were mixed to achieve a solid content weight ratio of 99.9/0.1. To the mixture was further added water, followed by stirring, to prepare the coating liquid 1 for a coating layer with a solid content concentration of 40% by weight for the PHBH and the adhesive combined.
(Production of Coated Paper)
The coating liquid 1 for a coating layer was applied to one side of a paper base material (cup base paper with a grammage of 200 g/m²) by a bar blade method so that the coating amount in dry weight was 20.0 g/m², which was then dried at 160° C. to obtain a coated paper.

Example 2

A coated paper was obtained in the same manner as Example 1 except that the solid content weight ratio of the PHBH aqueous dispersion liquid and the adhesive in the coating liquid 1 for a coating layer was changed to 99.0/1.0.

Example 3

A coated paper was obtained in the same manner as Example 1 except that the solid content weight ratio of the PHBH aqueous dispersion liquid and the adhesive in the coating liquid 1 for a coating layer was changed to 98.0/2.0.

Example 4

A coated paper was obtained in the same manner as Example 1 except that the solid content weight ratio of the PHBH aqueous dispersion liquid and the adhesive in the coating liquid 1 for a coating layer was changed to 90.0/10.0.

Example 5

A coated paper was obtained in the same manner as Example 1 except that the solid content weight ratio of the PHBH aqueous dispersion liquid and the adhesive in the coating liquid 1 for a coating layer was changed to 80.0/20.0.

Example 6

A coated paper was obtained in the same manner as Example 1 except that the solid content weight ratio of the PHBH aqueous dispersion liquid and the adhesive in the coating liquid 1 for a coating layer was changed to 75.0/25.0.

Example 7

A coated paper was obtained in the same manner as Example 1 except that the solid content weight ratio of the PHBH aqueous dispersion liquid and the adhesive in the coating liquid 1 for a coating layer was changed to 70.0/30.0.

Example 8

A coated paper was obtained in the same manner as Example 1 except that the solid content weight ratio of the PHBH aqueous dispersion liquid and the adhesive in the coating liquid 1 for a coating layer was changed to 60.0/40.0.

Example 9

(Preparation of Coating Liquid 2 for Coating Layer)
A PHBH aqueous dispersion liquid and an adhesive (partially-saponified ethylene-vinyl acetate copolymer RS-1713 manufactured by KURARAY CO., LTD.) were mixed to achieve a solid content weight ratio of 98.0/2.0. To the mixture was further added water, followed by stirring, to prepare the coating liquid 2 for a coating layer with a solid content concentration of 40% by weight for the PHBH and the adhesive combined.
(Production of Coated Paper)
A coated paper was obtained in the same manner as Example 1 except that the coating liquid 1 for a coating layer was changed to the coating liquid 2 for a coating layer.

Example 10

(Preparation of Coating Liquid for Seal Layer)
Kaolin (KCS manufactured by Imerys) and a binder (fully-saponified polyvinyl alcohol 28-98 manufactured by KURARAY CO., LTD.) were mixed to achieve a solid content weight ratio of 90.0/10.0. To the mixture was further added water, followed by stirring, to prepare a coating liquid for a seal layer with a solid content concentration of 35% by weight.
(Production of Coated Paper)

The coating liquid for a seal layer was applied to one side of a paper base material (cup base paper with a grammage of 200 g/m$^2$) by a bar blade method so that the coating amount in dry weight was 10.0 g/m$^2$, which was then dried to obtain the seal layer coated paper.

The coating liquid 2 for a coating layer was applied to the seal layer of the seal layer coated paper by a bar blade method so that the coating amount in dry weight was 20.0 g/m$^2$, which was then dried at 160° C. to obtain the coated paper.

Example 11

A coated paper was obtained in the same manner as Example 9 except that the solid content weight ratio of the PHBH aqueous dispersion liquid and the adhesive in the coating liquid 2 for a coating layer was changed to 90.0/10.0.

Example 12

(Preparation of Coating Liquid 3 for Coating Layer)

A PHBH aqueous dispersion liquid and an adhesive (oxidized starch PLV-500 manufactured by Sanwa Starch Co., Ltd.) were mixed to achieve a solid content weight ratio of 90.0/10.0. To the mixture was further added water, followed by stirring, to prepare the coating liquid 3 for a coating layer with a solid content concentration of 40% by weight.
(Production of Coated Paper)

A coated paper was obtained in the same manner as Example 1 except that the coating liquid 1 for a coating layer was changed to the coating liquid 3 for a coating layer.

Example 13

A coated paper was obtained in the same manner as Example 9 except that the coating amount of the coating layer in dry weight was changed to 1.0 g/m$^2$.

Example 14

A coated paper was obtained in the same manner as Example 9 except that the coating amount of the coating layer in dry weight was changed to 5.0 g/m$^2$.

Example 15

A coated paper was obtained in the same manner as Example 9 except that the coating amount of the coating layer in dry weight was changed to 10.0 g/m$^2$.

Example 16

A coated paper was obtained in the same manner as Example 9 except that the coating amount of the coating layer in dry weight was changed to 30.0 g/m$^2$.

Example 17

A coated paper was obtained in the same manner as Example 9 except that the coating amount of the coating layer in dry weight was changed to 40.0 g/m$^2$.

Example 18

A coated paper was obtained in the same manner as Example 9 except that the coating amount of the coating layer in dry weight was changed to 50.0 g/m$^2$.

Example 19

A coating liquid for a seal layer was applied to one side of a paper base material (cup base paper with a grammage of 200 g/m$^2$) by a bar blade method so that the coating amount in dry weight was 10.0 g/m$^2$, which was then dried to obtain the seal layer coated paper.

The coating liquid 2 for a coating layer was applied to the seal layer of this seal layer coated paper by a bar blade method so that the coating amount in dry weight was 10.0 g/m$^2$, which was then dried at 160° C. to obtain the coated paper.

Comparative Example 1

A coated paper was obtained in the same manner as Example 1 except that the solid content weight ratio of the PHBH aqueous dispersion liquid and the adhesive (fully-saponified polyvinyl alcohol) in the coating liquid 1 for a coating layer was changed to 100/0.

Comparative Example 2

A coated paper was obtained in the same manner as Example 1 except that the solid content weight ratio of the PHBH aqueous dispersion liquid and the adhesive (fully-saponified polyvinyl alcohol) in the coating liquid 1 for a coating layer was changed to 50.0/50.0.

Comparative Example 3

A coated paper was obtained in the same manner as Example 12 except that the solid content weight ratio of the PHBH aqueous dispersion liquid and the adhesive (oxidized starch) in the coating liquid 3 for a coating layer was changed to 50.0/50.0.
(Evaluation Method)

The obtained coated paper was evaluated as follows. The results are shown in Table 1.
(1) Coating Defects A scanning electronic microscope was used to observe the surface of the coating layer, and the presence/absence of coating defects such as cracks or pinholes in a 1-mm square area (an area of 1 mm$^2$) was confirmed. Coating defects were evaluated according to the following criteria.
[Evaluation Criteria]
  ○: No coating defect was found.
  X: Coating defect was found.
(2) Adhesion to Base Material A cellophane tape (25 mm in width) was adhered to the surface of the coating layer, and a rubber roller having a width of 130 mm and a weight of 1.8 kg was rolled over the cellophane tape under its own weight back and forth 5 times to closely attach the cellophane tape to the surface of the coating layer.

Immediately after that, the cellophane tape was vigorously peeled off. The ratio of the area where the coating layer attached to the cellophane tape and was peeled from the surface of the paper base material (the area of interfacial fracture) with respect to the area to which the cellophane tape was adhered, or the ratio of the area where part of the paper base material attached to the cellophane tape together with the coating layer, so that the paper base material was damaged (the area of internal fracture of the paper base material) was calculated. The adhesion to the paper base material was evaluated according to the following criteria. When the evaluation was "⊚", "○", or "Δ", there is no practical issue. It should be noted that, when the evaluation for the ratio of the area where the coating layer was peeled off differs from the evaluation for the ratio of the area where the paper base material was damaged, more strict evaluation was chosen.

[Evaluation Criteria]
- ⊚: The ratio of the area where the coating layer was peeled off was less than 5%, or the ratio of the area where the paper base material was damaged was 95% or more.
- ○: The ratio of the area where the coating layer was peeled off was 5% or more and less than 10%, or the ratio of the area where the paper base material was damaged was 90% or more and less than 95%.
- Δ: The ratio of the area where the coating layer was peeled off was 10% or more and less than 30%, or the ratio of the area where the paper base material was damaged was 70% or more and less than 90%.
- X: The ratio of the area where the coating layer was peeled off was 30% or more, or the ratio of the area where the paper base material was damaged was less than 70%.

(3) Heat Sealability

Two 100-mm square test pieces were cut out from the obtained coated paper, and the pieces of coated paper were brought into contact with each other, which were then heat-sealed under a pressurizing temperature of 160° C., a pressurizing pressure of 2 kgf/cm$^2$, and a pressurizing time of one second.

The heat-sealed test pieces were peeled apart by hand, and the peeled portion was visually observed to evaluate heat sealability according to the following criteria. When the evaluation was "○" or "Δ", there was no practical issue.

[Evaluation Criteria]
- ○: Peeling occurred inside the paper base material (paper base material was ruptured).
- Δ: Peeling occurred mostly inside the paper base material (paper base material was ruptured).
- X: Peeling occurred between the coating layers.

(4) Water Resistance

Water absorptiveness (Cobb value) was measured in accordance with "Paper and board—Determination of water absorptiveness—Cobb Method" specified in JIS P 8140: 1998 at any two points on the surface of the coating layer with a contact time of 120 seconds.

The average value of water absorptiveness (Cobb value) measured at two points was adopted as a value of water resistance, and water resistance was evaluated according to the following criteria. When the evaluation was "⊚", "○", or "Δ", there was no practical issue.

[Evaluation Criteria]
- ⊚: Average value of water absorptiveness (Cobb value) was 5 g/m$^2$ or less.
- ○: Average value of water absorptiveness (Cobb value) exceeded 5 g/m$^2$ and was 10 g/m$^2$ or less.
- Δ: Average value of water absorptiveness (Cobb value) exceeded 10 g/m$^2$ and was 20 g/m$^2$ or less.
- X: Average value of water absorptiveness (Cobb value) exceeded 20 g/m$^2$.

(5) Oil Resistance

The Kit number was measured at any five points on the surface of the coating layer in accordance with "Paper and Paperboard—Testing Method for Oil Repellency—Kit Method" specified in JAPAN TAPPI No. 41: 2000.

The average value of the Kit number measured at five points was adopted as a value of oil resistance, and oil resistance was evaluated according to the following criteria. When the evaluation was "○" or "Δ", there was no practical issue.

[Evaluation Criteria]
- ○: Average value of Kit number was 12.
- Δ: Average value of Kit number was 10 or higher and lower than 12.
- X: Average value of Kit number was lower than 10.

TABLE 1

|  |  | Example 1 | Example 2 | Example 3 | Example 4 | Example 5 | Example 6 | Example 7 | Example 8 |
|---|---|---|---|---|---|---|---|---|---|
| Paper base material | Oken smoothness (seconds) | 20 | 20 | 20 | 20 | 20 | 20 | 20 | 20 |
| Coating layer | PHBH | 99.9 | 99.0 | 98.0 | 90.0 | 80.0 | 75.0 | 70.0 | 60.0 |
|  | Fully-saponified polyvinyl alcohol | 0.1 | 1.0 | 2.0 | 10.0 | 20.0 | 25.0 | 30.0 | 40.0 |
|  | Partially-saponified ethylene-vinyl acetate copolymer | 0 | 0 | 0 | 0 | 0 | 0 | 0 | 0 |
|  | Oxidized starch | 0 | 0 | 0 | 0 | 0 | 0 | 0 | 0 |
|  | Coating amount (g/m$^2$) | 20.0 | 20.0 | 20.0 | 20.0 | 20.0 | 20.0 | 20.0 | 20.0 |
|  | Seal layer | Absence | Absence | Absence | Absence | Absence | Absence | Absence | Absence |
|  | Coating defect | ○ | ○ | ○ | ○ | ○ | ○ | ○ | ○ |
|  | Adhesion to paper base material | Δ | ○ | ⊚ | ⊚ | ⊚ | ⊚ | ⊚ | ⊚ |

TABLE 1-continued

|  |  |  |  |  |  |  |  |  |
|---|---|---|---|---|---|---|---|---|
| Heat sealability | ○ | ○ | ○ | ○ | ○ | ○ | Δ | Δ |
| Water resistance | ○ | ○ | ○ | ○ | ○ | ○ | ○ | Δ |
| Oil resistance | ○ | ○ | ○ | ○ | ○ | ○ | ○ | ○ |

|  |  | Example 9 | Example 10 | Example 11 | Example 12 | Example 13 | Example 14 | Example 15 | Example 16 |
|---|---|---|---|---|---|---|---|---|---|
| Paper base material | Oken smoothness (seconds) | 20 | 20 | 20 | 20 | 20 | 20 | 20 | 20 |
| Coating layer | PHBH | 98.0 | 98.0 | 90.0 | 90.0 | 98.0 | 98.0 | 98.0 | 98.0 |
|  | Fully-saponified polyvinyl alcohol | 0 | 0 | 0 | 0 | 0 | 0 | 0 | 0 |
|  | Partially-saponified ethylene-vinyl acetate copolymer | 2.0 | 2.0 | 10.0 | 0 | 2.0 | 2.0 | 2.0 | 2.0 |
|  | Oxidized starch | 0 | 0 | 0 | 10.0 | 0 | 0 | 0 | 0 |
|  | Coating amount (g/m²) | 20.0 | 20.0 | 20.0 | 20.0 | 1.0 | 5.0 | 10.0 | 30.0 |
| Seal layer |  | Absence | Presence | Absence | Absence | Absence | Absence | Absence | Absence |
| Coating defect |  | ○ | ○ | ○ | ○ | ○ | ○ | ○ | ○ |
| Adhesion to paper base material |  | ⊚ | ⊚ | ⊚ | ○ | Δ | ○ | ⊚ | ⊚ |
| Heat sealability |  | ○ | ○ | ○ | ○ | Δ | ○ | ○ | ○ |
| Water resistance |  | ⊚ | ⊚ | ⊚ | ○ | Δ | Δ | ○ | ⊚ |
| Oil resistance |  | ○ | ○ | ○ | ○ | Δ | Δ | ○ | ○ |

|  |  | Example 17 | Example 18 | Example 19 | Comparative Example 1 | Comparative Example 2 | Comparative Example 3 |
|---|---|---|---|---|---|---|---|
| Paper base material | Oken smoothness (seconds) | 20 | 20 | 20 | 20 | 20 | 20 |
| Coating layer | PHBH | 98.0 | 98.0 | 98.0 | 100 | 50.0 | 50.0 |
|  | Fully-saponified polyvinyl alcohol | 0 | 0 | 0 | 0 | 50.0 | 0 |
|  | Partially-saponified ethylene-vinyl acetate copolymer | 2.0 | 2.0 | 2.0 | 0 | 0 | 0 |
|  | Oxidized starch | 0 | 0 | 0 | 0 | 0 | 50.0 |
|  | Coating amount (g/m²) | 40.0 | 50.0 | 10.0 | 20.0 | 20.0 | 20.0 |
| Seal layer |  | Absence | Absence | Presence | Absence | Absence | Absence |
| Coating defect |  | ○ | ○ | ○ | X | ○ | ○ |
| Adhesion to paper base material |  | ⊚ | ⊚ | ⊚ | X | ⊚ | ○ |
| Heat sealability |  | ○ | ○ | ○ | ○ | X | X |
| Water resistance |  | ⊚ | ⊚ | ⊚ | Δ | X | X |
| Oil resistance |  | ○ | ○ | ○ | Δ | ○ | X |

The coated paper of Examples 1 to 19 according to the present invention had no coating defect in the coating layer and showed performance attributed to PHBH contained in the coating layer.

The coated paper obtained in Comparative Example 1 in which the coating layer did not include the adhesive showed a coating defect in the coating layer, and adhesion between the coating layer and the paper base material was poor.

The coated paper obtained in Comparative Examples 2 and 3 in which the coating layer included a large amount of adhesive had a coating layer without coating defects, but performance attributed to PHBH was not sufficiently manifested.

What is claimed:
1. A coated paper characterized in that:
the coated paper includes a coating layer comprising poly(3-hydroxybutyrate-co-3-hydroxyhexanoate) and an adhesive, on at least one side of a paper base material,
wherein a solid content weight ratio of the poly(3-hydroxybutyrate-co-3-hydroxyhexanoate) to the adhesive in the coating layer is in a range of 99.9/0.1 to 60.0/40.0,
the coating layer contains a fully-saponified polyvinyl alcohol as the adhesive and contains no surfactants, a coating amount (dry weight) of the coating layer is in a range of 1.0 g/m² or more and 50.0 g/m² or less per one side, and the coating layer is a heat-sealing, water-resistant, and oil-resistant layer.

2. The coated paper according to claim 1, characterized in that a grammage of the paper base material is in a range of 20 g/m² or more and 600 g/m² or less as measured in accordance with JIS P 8124.

3. The coated paper according to claim 1, characterized in that the paper base material has the coating layer comprising the poly(3-hydroxybutyrate-co-3-hydroxyhexanoate) and the adhesive, on both sides of the paper base material.

4. The coated paper according to claim 1, characterized by further comprising a seal layer between the paper base material and the coating layer.

5. The coated paper according to claim 4, characterized in that a coating amount (dry weight) of the seal layer is in a range of 3.0 g/m² or more and 15.0 g/m² or less per one side.

6. The coated paper according to claim 1, which is formed as a paper cup.

7. The coated paper according to claim 1, which is formed as a paper container.

8. The coated paper according to claim 1, which is formed as a paper box.

9. The coated paper according to claim 1, which is formed as a paper plate.

10. The coated paper according to claim 1, which is formed as a paper tray.

11. The coated paper according to claim 6, wherein a grammage of the paper base material is in a range of 150 g/m² or more and 300 g/m² or less as measured in accordance with JIS P 8124.

* * * * *